US011307027B2

(12) United States Patent
Morovic et al.

(10) Patent No.: US 11,307,027 B2
(45) Date of Patent: Apr. 19, 2022

(54) DETERMINING A CHARACTERISTIC OF A SUBSTRATE

(71) Applicant: Hewlett-Packard Development Company, L.P., Spring, TX (US)

(72) Inventors: Peter Morovic, Sant Cugat del Valles (ES); Jan Morovic, London (GB); Hector Gomez Minano, Sant Cugat del Valles (ES); Marcos Casaldaliga Albisu, Sant Cugat del Valles (ES); Joan Jordi Coll Sicluna, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 195 days.

(21) Appl. No.: 16/475,626

(22) PCT Filed: Apr. 25, 2017

(86) PCT No.: PCT/US2017/029402
§ 371 (c)(1),
(2) Date: Jul. 2, 2019

(87) PCT Pub. No.: WO2018/199933
PCT Pub. Date: Nov. 1, 2018

(65) Prior Publication Data
US 2021/0325175 A1 Oct. 21, 2021

(51) Int. Cl.
*G01B 11/30* (2006.01)
*B41F 33/00* (2006.01)
*G01N 21/86* (2006.01)
(52) U.S. Cl.
CPC ........ *G01B 11/303* (2013.01); *B41F 33/0036* (2013.01); *G01N 21/86* (2013.01)

(58) Field of Classification Search
CPC .. G01B 11/303; G01N 21/86; H04N 1/00323; B41F 33/0036
See application file for complete search history.

(56) References Cited

U.S. PATENT DOCUMENTS

| 5,689,757 A | 11/1997 | Ferrante et al. |
| 6,226,085 B1 * | 5/2001 | Weber .................. G01B 11/303 |
| | | 356/236 |

(Continued)

FOREIGN PATENT DOCUMENTS

| CN | 1473267 | 2/2004 |
| CN | 1771504 | 5/2006 |

(Continued)

OTHER PUBLICATIONS

Unknown, "Automated Tape Library", Barcode Label Technical Brief, May 2010, 16 pages. < https://docs.oracle.com/cd/E19912-01/TT0006D/TT0006D.pdf >.

(Continued)

*Primary Examiner* — Hina F Ayub
(74) *Attorney, Agent, or Firm* — HP Inc. Patent Department

(57) ABSTRACT

A method is described in which a reflection is obtained of a laser light pattern reflected from a substrate. A reflection of diffuse light may be obtained from the substrate. A first parameter may be determined, relating to the substrate from the reflected laser light pattern. A second parameter may be determined, relating to the substrate from the reflected diffuse light and a characteristic of the substrate may be determined from the first and second parameters. A print apparatus and a machine-readable medium are also disclosed.

14 Claims, 10 Drawing Sheets

(56) References Cited

U.S. PATENT DOCUMENTS

| | | | |
|---|---|---|---|
| 6,425,650 B1 | 7/2002 | Walker | |
| 6,838,687 B2 | 1/2005 | Tullis et al. | |
| 6,914,684 B1 | 7/2005 | Bolash et al. | |
| 7,055,925 B2 | 6/2006 | Subirada et al. | |
| 7,533,954 B2 | 5/2009 | Nakazawa et al. | |
| 8,189,197 B2 | 5/2012 | Wayman et al. | |
| 8,456,701 B2 | 6/2013 | Mestha et al. | |
| 8,671,838 B2 | 3/2014 | Berti et al. | |
| 2007/0019216 A1* | 1/2007 | Chodagiri | B41F 33/0036 |
| | | | 358/1.9 |
| 2010/0018419 A1* | 1/2010 | Whitelaw | B41F 5/20 |
| | | | 101/248 |
| 2011/0304862 A1* | 12/2011 | Itoh | G01N 21/8901 |
| | | | 358/1.9 |
| 2015/0153273 A1* | 6/2015 | Mantyla | G01N 33/346 |
| | | | 250/339.01 |
| 2015/0331402 A1 | 11/2015 | Lin et al. | |
| 2017/0339314 A1* | 11/2017 | Schmitt | H04N 1/6002 |

FOREIGN PATENT DOCUMENTS

| | | |
|---|---|---|
| CN | 1784595 | 6/2006 |
| CN | 102818787 | 12/2012 |
| CN | 104246483 | 12/2014 |
| JP | 2012225716 | 11/2012 |

OTHER PUBLICATIONS

International Search Report and Written Opinion dated Jan. 31, 2018, PCT Patent Application No. PCT/US2017/029402, filed Apr. 25, 2017, Federal Institute of Industrial Property, ISA/RU, 8 pages.

* cited by examiner

DETERMINING A CHARACTERISTIC OF A SUBSTRATE

CLAIM FOR PRIORITY

The present application is a national stage filing under 35 U.S.C. § 371 of PCT application number PCT/US2017/029402, having an international filing date of Apr. 25, 2017, the disclosure of which is hereby incorporated by reference in its entirety.

BACKGROUND

Print apparatuses, such as the print apparatuses used in industrial printing, process large print jobs in a continuous cycle and output the printed media in a stack. The continuous nature of such print cycles combined with the stacked output means that it is often not possible to manually check the print quality of individual printed pieces.

BRIEF DESCRIPTION OF DRAWINGS

Examples will now be described, by way of non-limiting example, with reference to the accompanying drawings, in which.

DETAILED DESCRIPTION

Figure 1:
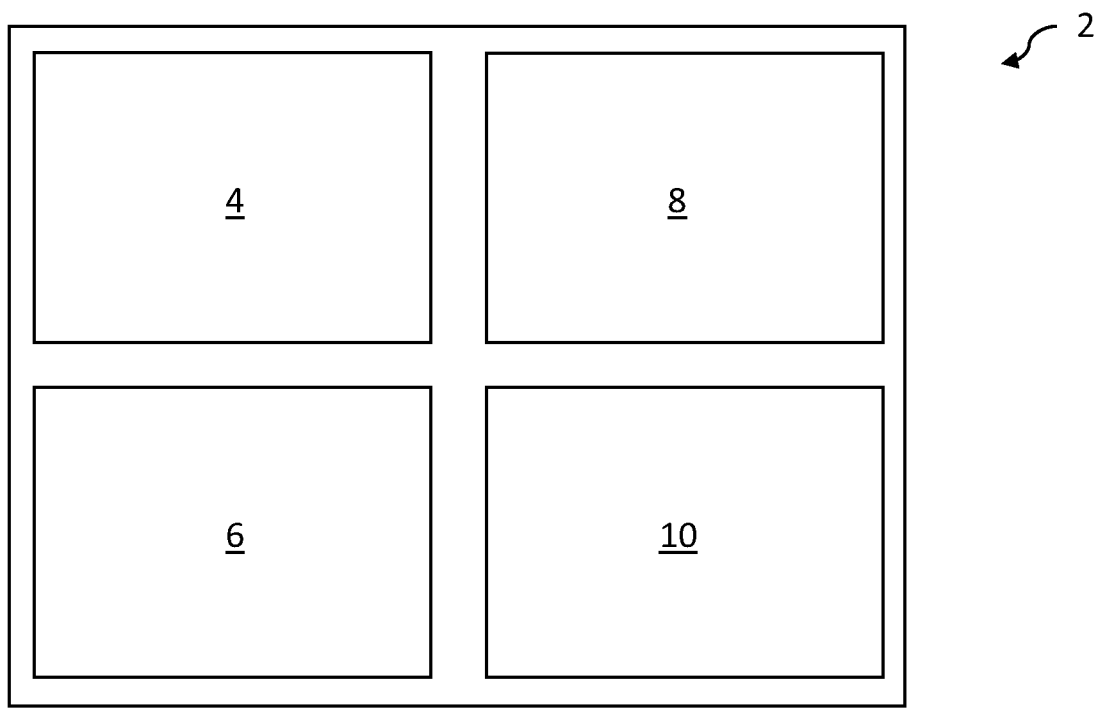
FIG. 1 is a simplified schematic of an example of an apparatus for printing according to an example.

According to some examples, there is a print apparatus 2 as shown schematically in FIG. 1. The print apparatus 2 may comprise a laser source 4, a diffuse light source 6, an image capture device 8 and processing circuitry 10. The laser source 4 may direct laser light onto a printable medium. The diffuse light source 6 may direct diffuse light onto the printable medium.

The image capture device 8 may be operable i) to detect laser light reflected from the printable medium and ii) to detect diffuse light reflected from the printable medium. As such, the laser source 4 and diffuse light source 6 respectively direct laser and diffuse light onto the printable medium and the image capture device 8 is used to the detect laser and/or diffuse light that is reflected from the surface of the printable medium.

The processing circuitry 10 may determine, from the reflected laser light, a first parameter relating to the printable medium. The processing circuitry 10 may determine, from the reflected diffuse light, a second parameter relating to the printable medium. The processing circuitry 10 may determine a characteristic of the printable medium using the first and second parameters.

In this way, a characteristic of the printable medium may be determined using a parameter derived from reflected laser light and a parameter derived from reflected diffuse light. As a result, the apparatus in FIG. 1 is able to calculate the characteristic of the printable medium more accurately than would be possible, for example, if the apparatus just used parameters derived from laser reflection, or just used parameters derived from a diffuse light source.

In some examples, the print apparatus 2 is an ink-jet printer, an electrostatic printer, a liquid electrostatic printer (LEP), a lithographic printer, a flexographic printer, a gravure printer or an offset printer. In some examples, the print apparatus 2 is a three dimensional printer, for example, the print apparatus 2 may comprise a printer that generates three-dimensional objects on a bed of build material in a layer-wise manner. These print apparatuses are merely examples, however, and the print apparatus may be of a different type not listed here.

Examples of printable media (also referred to herein as "printable substrates" or "substrates"), include, but are not limited to, paper, cardboard, transparencies and fabric (e.g. textile-based media).

In some examples, the diffuse light source 6 may emit light having a specific frequency spectrum. In some examples, the specific frequency spectrum may be predefined. The specific frequency spectrum may be chosen arbitrarily, so long as the spectrum can be compared to a measured spectrum. The specific frequency spectrum may be compared with a frequency spectrum of the reflected diffuse light as detected by the image capture device 8 to determine properties of the printable medium. The properties may include properties relating the colour of the printable medium, and/or an amount of light, over a range of frequencies, absorbed and/or reflected by the printable medium. In some examples, the frequency spectrum is stable over the lifetime of the diffuse light source. Therefore, a reliable comparison can be made over the lifetime of the diffuse light source. In some examples, the diffuse light source is a CIE D50 light source. A CIE light source is a standard illuminant, standardised in accordance with the International Commission on Illumination. A D50 light source emits light having a correlated colour temperature of 5003 K.

In some examples the image capture device 8 may be a camera such as an RGB camera (i.e. a camera which receives light as three separate components—red, green and blue). In some examples, the image capture device 8 produces image data of the reflected laser and/or diffuse light. In some examples, the image capture device 8 may produce a pixilated data file describing the relative detected intensities at each point (e.g. pixel) in the image. The image may be in a standardised format such as a .jpg or .png format.

In some examples, the processing circuitry 10 may control the laser source 4 and the diffuse light source 6 such that, during a first period, laser light is directed onto the substrate by the laser source 4 and, during a second period, diffuse light is directed onto the substrate by the diffuse light source 6. The laser source 4 and diffuse light source 6 may thus be alternated in order to obtain reflected laser light patterns and reflected diffuse light individually. The first period may be different to the second period.

In some examples, adjustments to the optics of the image capture device 8 may be made in order to optimise the detection of the reflected light (either laser or diffuse) to ensure the detected reflections are suitable for use in calculating the first and second parameters. For example, the image capture device may be focused on different portions of the printable medium (e.g. surface, edge or printed regions of the printable medium) for different measurements, and/or the focus of the image capture device may be adjusted depending on the resolution intended for different measurements. In some examples, different focal lengths are used to detect reflected laser light and reflected diffuse light respectively.

In some examples, the image capture device 8 may be set to a first focal length to image reflected laser light and to a second focal length to image reflected diffuse light. The first and second focal lengths may be different. In examples where the laser source 4 and the diffuse light source 6 alternately direct laser and diffuse light respectively onto the printable media, the image capture device 8 may correspondingly alternate between the first and second focal lengths in order to image the reflected laser light and the reflected diffuse light.

The laser source 4 may be directed onto the printable media at an angle. For example, the laser source 4 may be shone at the printable media at an angle of about 45 degrees with respect to the surface of the printable medium. In some examples, the 0/45 geometry is used. In some examples, the image capture device 8 is positioned such that when the laser source 4 is directed onto the printable medium, the laser light that is reflected from the surface of the printable medium passes into the lens of the image capture device 8.

Figure 2:
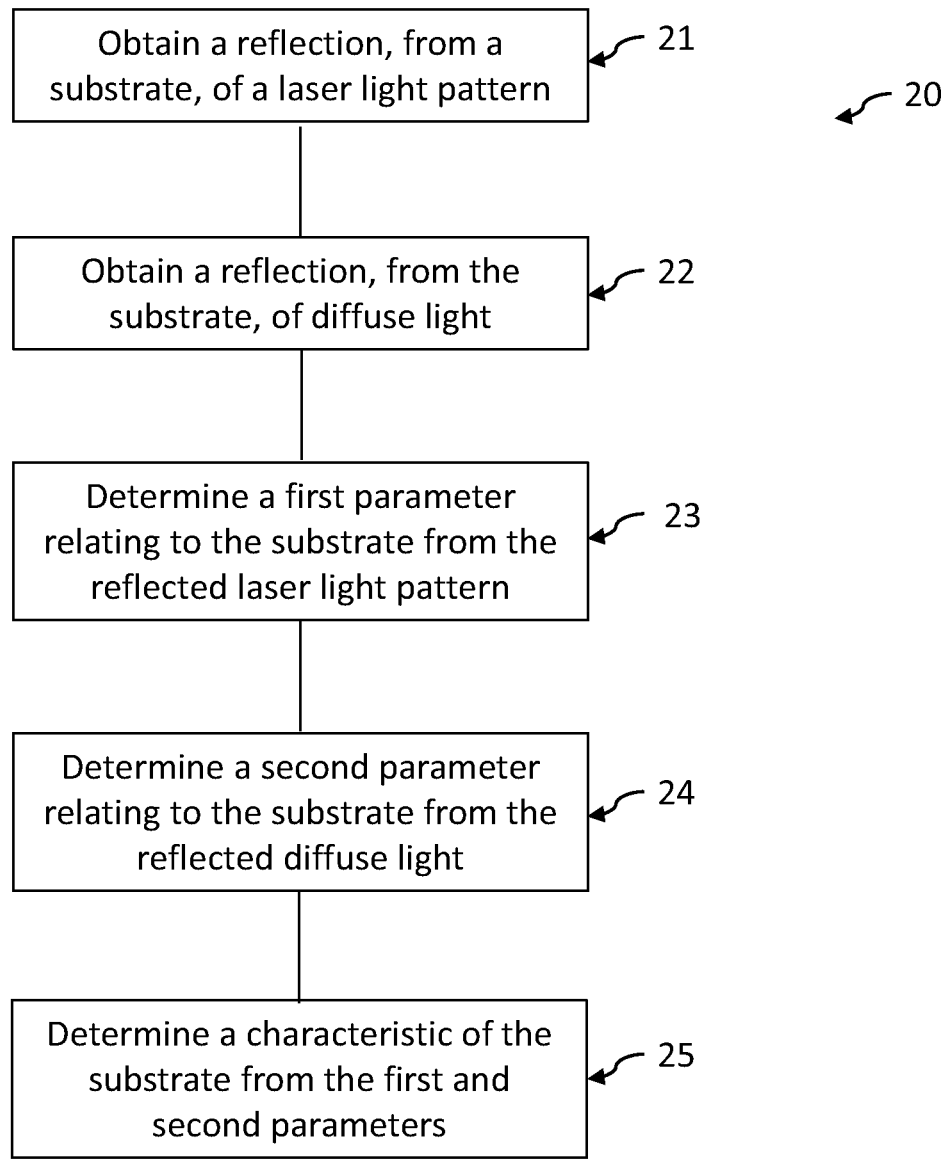
FIG. 2 is a flowchart of an example of a method of determining a characteristic of a substrate.

FIG. 2 is a flowchart of an example of a method 20 of determining a characteristic of a substrate. In some examples, the method 20 is performed by an apparatus such as the print apparatus 2 shown in FIG. 1, and described above. In other some examples, parts of the method may be performed remotely, for example, on a remote server or a processor that is separate from the printer.

In some examples, in a first block 21, the method 20 comprises obtaining a reflection, from a substrate, of a laser light pattern. A second block 22 comprises obtaining a reflection, from the substrate, of diffuse light. A third block 23 comprises determining, using a processor, a first parameter relating to the substrate from the reflected laser light pattern. A fourth block 24 comprises determining, using a processor, a second parameter relating to the substrate from the reflected diffuse light. A fifth block 25 comprises determining, using a processor, a characteristic of the substrate from the first and second parameters. In some examples, a single processor, or processing device, may be used to perform processes of multiple blocks. In other examples, each block may be performed by a separate processing device.

As noted above, examples of substrates include, but are not limited to paper, cardboard, transparencies and fabric (e.g. textile-based media).

Laser light is collimated and thus any scatter of the laser light from the substrate surface may be caused by the structure of the surface from which the laser was reflected. This can therefore be used to probe surface features of the substrate. As such, in some examples, the first parameter relates to a structural property of the substrate. For example, the first parameter may relate to a geometric property associated with the substrate. In other words, the first parameter may be related to a shape of a surface feature of the substrate. For example, the first parameter may be a surface pattern of the substrate, a thickness of the substrate, a measure of the scatter of the reflected laser light, due to the profile of the surface of the substrate, a measure of the roughness of the surface of the substrate or a measure of a surface feature characteristic of the method of manufacture of the substrate. In some examples, the thickness of the printable media is measured by directing the light across an edge portion (e.g. at the side or at an end) of the substrate and measuring the depth of the profile of the edge.

Reflections of diffuse light may, in some examples, be used to detect the colour of the substrate. As described above, if the diffuse light has a specific frequency distribution, then the specific frequency distribution can be compared to the frequency distribution of the light reflected from the substrate in order to determine the colour of the substrate (and/or the colour of a print agent applied to the surface of the substrate, as will be described in more detail below). Therefore, in some examples, the second parameter may relate to the colour of the substrate.

Figure 3:
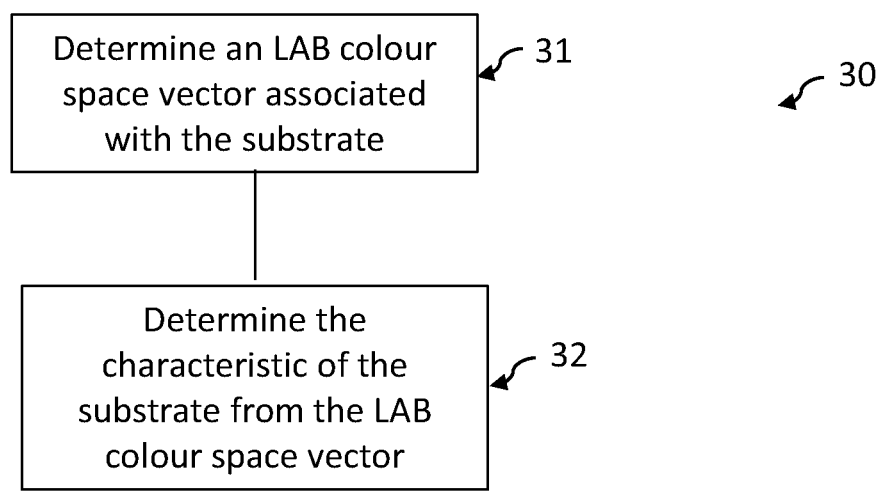
FIG. 3 is a flowchart of a further example of a method of determining a characteristic of a substrate.

FIG. 3 is a flowchart of a further example of a method 30 of determining a characteristic of a substrate. The method 30 may include blocks of the method 20 of FIG. 2. In some examples, the method 30 may comprise, at block 31, determining, using a processor, an LAB colour space vector associated with the substrate, using the reflected diffuse light. An LAB colour space vector is a vector having three dimensions, "L" representing lightness and a and b that describe green-red component and blue-yellow components of the light, respectively, as defined in standard CIELAB76. In some examples, the characteristic of the substrate may be determined (block 32), at least partially, from the LAB colour space vector.

As noted above, laser light and diffuse light probe different types of features associated with a substrate, which enable characteristics of the substrate to be determined more accurately, when compared to deriving a characteristic from either laser light or diffuse light alone. Determining characteristics with more accuracy in this way may facilitate improved substrate type recognition and improved automated quality control processes (e.g. detection of colour drift as described below).

In some examples, the characteristic of the substrate comprises the substrate type. For example, different substrates may have unique LAB colour space vectors, or unique combinations of colour and structural properties. In this way, the type of substrate can be accurately determined. This ability to determine a type of substrate may be used in quality control processes. If an incorrect substrate is fed into an industrial printer, as noted above, the continuous nature of industrial printers can result in a large batch being printed before an opportunity for correction arises. It also facilitates automated substrate loading.

Figure 4:
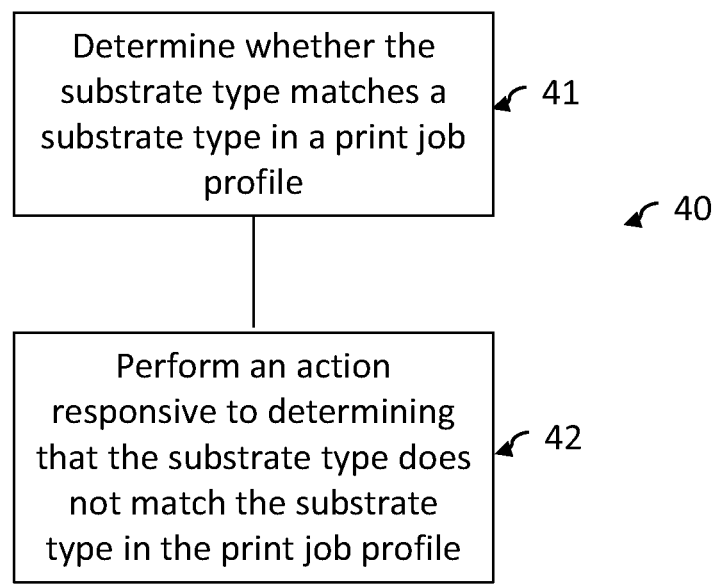
FIG. 4 is a flowchart of a further example of a method of determining a characteristic of a substrate.

FIG. 4 is a flowchart of a further example of a method 40 of determining a characteristic of a substrate. The method 40 may include blocks of the method 20 and/or 30. In some examples, the determined substrate type may be used in a quality control process. For example, the method 40 may comprise, at block 41, after determining the substrate type, performing a check to determine whether the determined substrate type matches a substrate type in a print job profile. A print job profile may include specifications of the print job. In some examples, a print job profile may include, but is not limited to, information relating to the type of substrate that print agent is to be printed onto.

If it is determined that the determined substrate does not match a substrate type in the print job profile, then appropriate action may be taken. Thus, the method 40 may comprise, at block 42, performing an action responsive to determining that the substrate type does not match the substrate type in the print job profile.

In some examples, the action to be performed (block 42) may comprise alerting a user that the substrate type does not match the expected substrate type. The alert may be in the form of an error message. In some examples, the action to be performed (block 42) may comprise sending a command to a printer to instruct the printer to pause printing. The printer may be instructed to pause printing until explicitly commanded to resume printing by the user. In some examples, the action to be performed (block 42) may comprise changing a substrate of a first type for a substrate of a second, different type (e.g. the correct substrate as detailed in the print job profile). If it is determined at block 41 that the determined substrate does not match a substrate type in the print job profile, then the method may, in some examples, comprise recording the determination and/or the detected substrate type in a log. Multiple actions may be performed.

Figure 5:
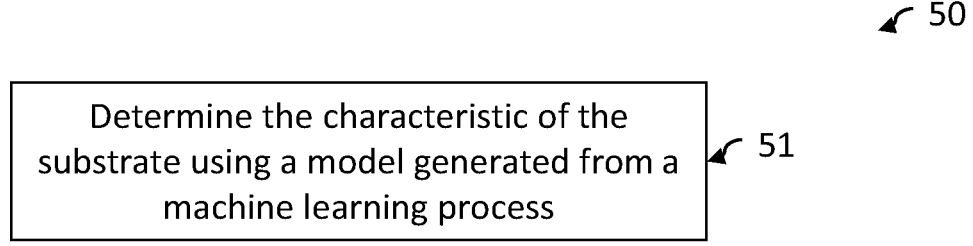
FIG. 5 is a flowchart of a further example of a method of determining a characteristic of a substrate.

FIG. 5 is a flowchart of a further example of a method 50 of determining a characteristic of a substrate. The method 50 may include blocks of the methods 20, 30 and/or 40. According to some examples, the method 50 may comprise, at block 51, determining, using a processor, the characteristic of the substrate using a model generated from a machine learning process. The laser and diffuse light setups described above provide complementary information about the substrate that can be used as input parameters to a machine learning process. Therefore, in some examples, the first and second parameters may form inputs for a machine learning process. As noted above, the output of the machine learning process may be more robust when parameters derived from both laser light and diffuse light are used, compared to if just laser light or just diffuse light are used alone.

In some examples, the focus of the machine learning process may be on supervised learning. In some examples, the focus of the machine learning process may be on categorisation or clustering. In some examples, operations such as k-means or support vector operations may be used. In some machine learning approaches, the machine learning process can be trained on a training data set where the training data set contains values of various parameters that are associated with a particular substrate type. This training data is used to build an initial model that can be used to predict the substrate type of an unknown substrate. The machine learning process may be further tuned in-use through user interaction. For example, a user can confirm a prediction made using a model output by the machine process as being correct, or reject a prediction as incorrect and this data can be added to the training data set to improve the model generated by the machine learning process.

Figure 6:
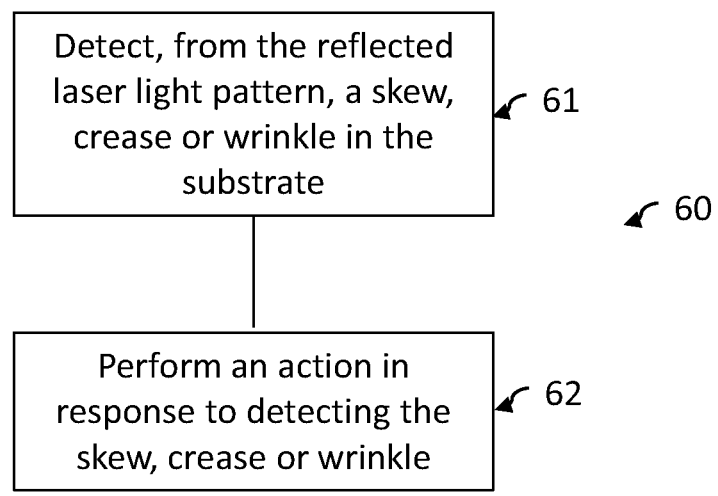
FIG. 6 is a flowchart of a further example of a method of determining a characteristic of a substrate.

FIG. 6 is a flowchart of a further example of a method 60 of determining a characteristic of a substrate. The method 60 may include blocks of the methods 20, 30, 40 and/or 50. In some examples, the method 60 may comprise, at block 61, detecting, from the reflected laser light pattern, a skew, crease or wrinkle in the substrate. For example, the laser light may be used to detect the profile of an edge of the substrate. If the edge profile indicates that the edge of the substrate is at an angle (i.e. skewed) with respect to the direction of travel of the substrate through a printer, then this may indicate that the paper is skewed. If an angle of the edge profile changes over time (i.e. if the angle of the trailing edge changes between different pieces of print substrate) then this may indicate that the substrate is moving at an angle (i.e. a skew). Skewed substrates can lead, for example, to misalignment of a printed region relative to the substrate or to the substrate jamming in the printer.

In some examples, the laser light may be scanned over at least a portion of the surface of the substrate. Reflected laser light may be used to generate a surface profile of the scanned portion of the substrate surface. Surface profiles indicative of raised areas may indicate structural defects representative of a poor quality substrate, or of wrinkles where the substrate has been concertinaed or bunched as it passed through the print apparatus.

In some examples, when a skew, crease or wrinkle is detected, appropriate action may be taken. Thus, the method 60 may comprise, at block 62, performing an action in response to detecting the skew, crease or wrinkle. In some examples, the action performed at block 62 may comprise pausing a print job, alerting a user, delivering an error message to a user, discarding a substrate and/or recording the detection of the skew, crease or wrinkle in a log. In some examples, the log is an error log.

Figure 7:
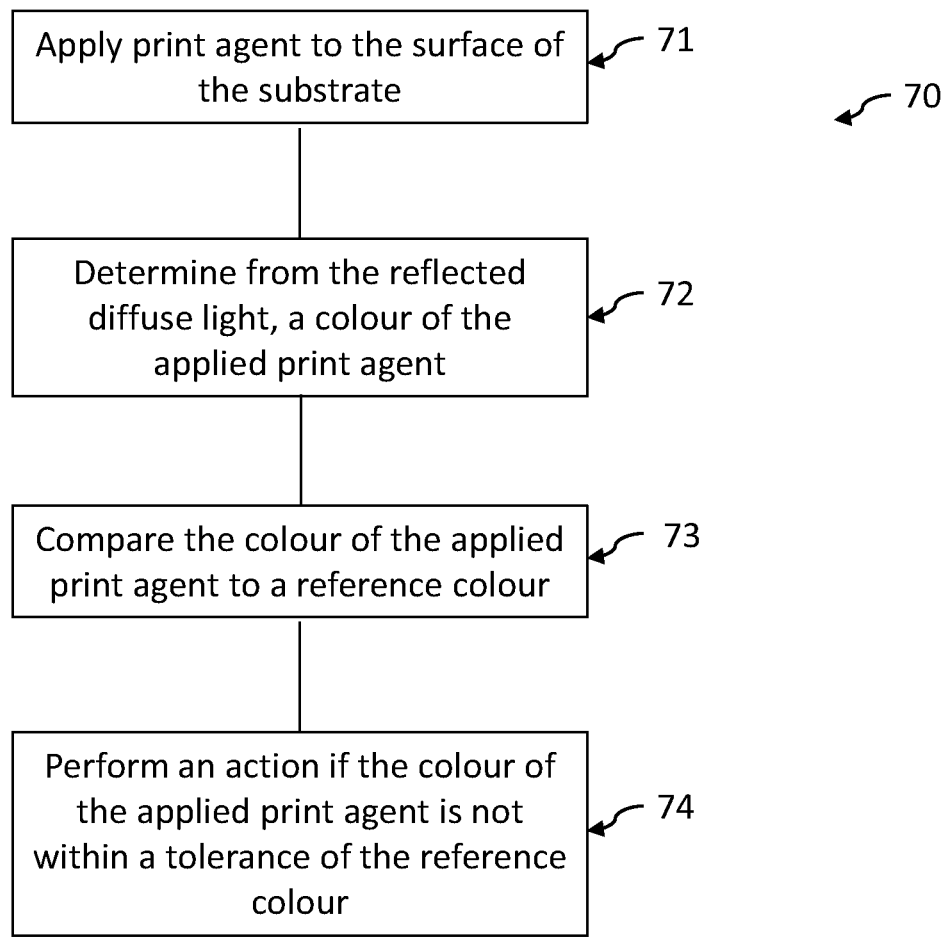
FIG. 7 is a flowchart of a further example of a method of determining a characteristic of a substrate.

FIG. 7 is a flowchart of a further example of a method 70 of determining a characteristic of a substrate. The method 70 may include blocks of the methods 20, 30, 40, 50 and/or 60. In some examples, the method 70 may comprise, at block 71, applying print agent to a portion of the surface of the substrate. The method 70 may comprise, at block 72, determining from the reflected diffuse light, a colour of the applied print agent. At block 73, the colour of the applied print agent may then be compared to a reference colour. In some examples, the reference colour may be part of a print job specification, as described above.

In some examples, the method 70 may comprise, at block 74, performing an action if the colour of the applied print agent is not within a tolerance of the reference colour. The tolerance may, for example, be a difference in colour that is within the quality control bounds of the job being undertaken by the printer.

In some examples, the action performed at block 74 comprises pausing a print job, alerting a user, delivering an error message to a user, discarding a substrate and/or recording the detection of the colour difference in a log, if the colour difference metric is greater than a threshold. In some examples, the log may be an error log.

In some examples, a range of RGB (red, green, blue component) values may exist within which the colour of the applied print agent is deemed to have passed a colour-quality control test. In some examples, if the detected colour of the applied print agent is outside of the range of RGB values, this may indicate an error in the printer, for example, an error in the colour calibration, an ink error (e.g. the wrong ink has been loaded into the printer) or an indication that an ink cartridge should be replaced.

Figure 8:
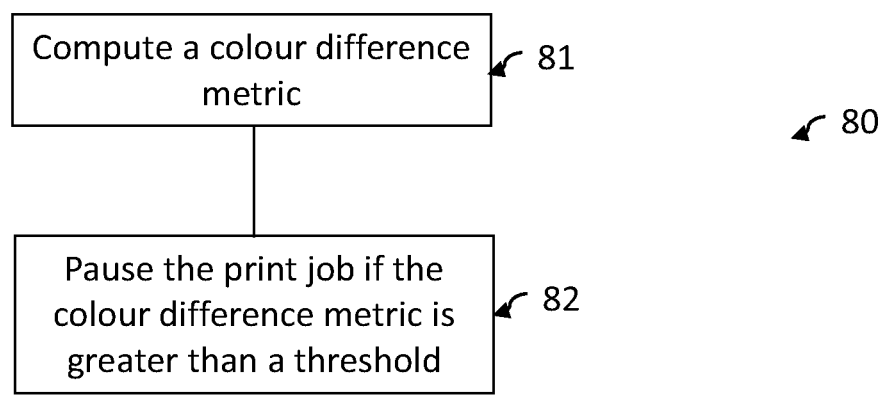
FIG. 8 is a flowchart of a further example of a method of determining a characteristic of a substrate.

FIG. 8 is a flowchart of a further example of a method 80 of determining a characteristic of a substrate. The method 80 may include blocks of the methods 20, 30, 40, 50, 60 and/or 70. In some examples, the method 80 may comprise, at block 81, computing, using a processor, a colour difference metric. The method 80 may comprise, at bock 82, pausing a print job if the colour difference metric is greater than a threshold. In some examples, alternative action may be performed if the colour difference metric is greater than a threshold, such as actions discussed above.

A colour difference metric describes the difference in RGB values between two colours (e.g. between the colour of the applied print agent and the reference colour). In some examples, the colour difference metric may be a LAB Delta E metric (calculated, for example, with CIEDE2000 metric revision).

Figure 9:
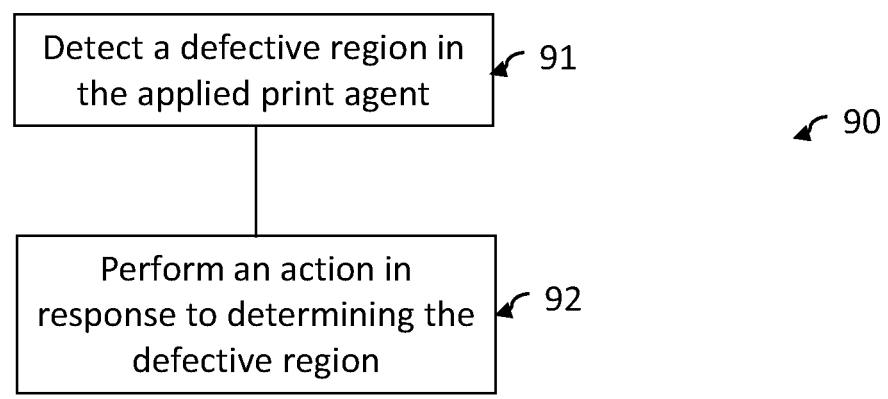
FIG. 9 is a flowchart of a further example of a method of determining a characteristic of a substrate.

FIG. 9 is a flowchart of a further example of a method 90 of determining a characteristic of a substrate. The method 90 may include blocks of the methods 20, 30, 40, 50, 60, 70 and/or 80. In some examples, the method 90 may comprise, at block 91, detecting a defective region in the applied print agent. The method 90 may comprise, at block 92, performing an action in response to determining the defective region. For example, the defective region may be due to colour drift. Colour drift (i.e. a slow change in the printed colour over time) may occur when an ink cartridge begins to run out, or due to a nozzle of a print head functioning incorrectly. In some examples, the defective region may be a sub-patch artefact. A subpatch artefact is an artefact on a scale smaller than the printing die. In some examples, the printing die contains one or more sets of nozzles (>~1000) manufactured at once from the same silicon die and fed from the same print agent channel. Ordinarily, such a set of nozzles prints a uniform patch, in terms of colour, but colour differences can occur within a die or sub-patch due to second order effects such as thermal differences within the die or aerodynamic effects on the printer.

It will be recognised that the method and apparatus herein permit a wider range of quality control metrics to be measured, and the detection of a wider range of print errors, than is permitted through the use of either a laser source 4 or a diffuse light source 6 individually.

Figure 10:
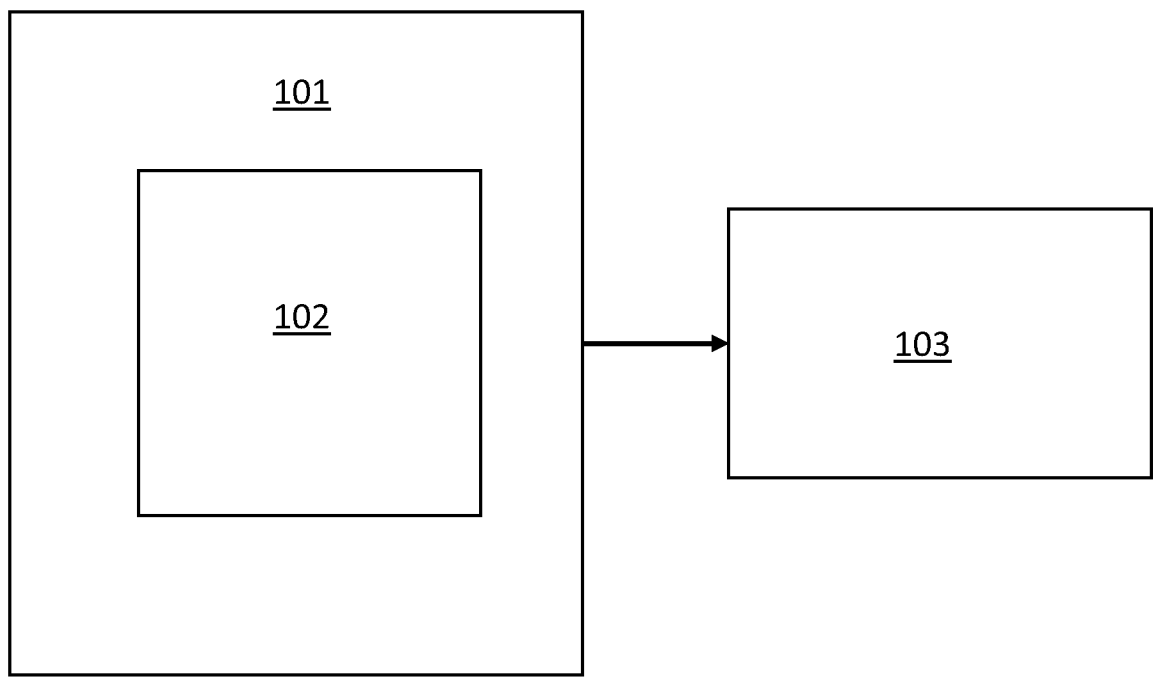
FIG. 10 is a simplified schematic of a machine-readable medium and a processor according to an example.

FIG. 10 shows, schematically, a machine-readable medium 101 and a processor 103. The machine-readable medium 101 may comprise instructions 102 which, when executed by the processor 103, cause the processor to i) obtain first image data relating to a reflection of laser light from a printable substrate, ii) obtain second image data relating to a reflection of diffuse light from the printable substrate iii) determine, from the first image data, a first parameter relating to the printable substrate, iv) determine, from the second image data, a second parameter relating to the printable substrate, and v) determine, using the first and second parameters, a characteristic of the printable substrate.

Examples in the present disclosure can be provided as methods, systems or machine readable instructions. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a process for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that it will be possible to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method, comprising:
   obtaining a reflection, from a substrate, of a laser light pattern;
   obtaining a reflection, from the substrate, of diffuse light;
   determining, using a processor, a first parameter relating to the substrate from the reflected laser light pattern;
   determining, using the processor, a second parameter relating to the substrate from the reflected diffuse light; and
   determining, using the processor, a characteristic of the substrate from the first and second parameters using a model generated from a machine learning process.

2. A method as in claim 1, wherein the first parameter relates to a structural property of the substrate.

3. A method as in claim 1, wherein the first parameter comprises one of:
   substrate thickness;
   a measure of a scatter of the reflected laser light, due to a profile of a surface of the substrate;
   a measure of roughness of the surface of the substrate; and
   a measure of a surface feature characteristic of a method of manufacture of the substrate.

4. A method as in claim 1, wherein the second parameter relates to the color of the substrate.

5. A method as in claim 1, comprising:
   determining, using the processor, an LAB color space vector associated with the substrate; and determining, using the processor, the characteristic of the substrate from the LAB color space vector.

6. A method as in claim 1, herein the characteristic of the substrate comprises a substrate type.

7. A method as in claim 6, comprising:
using the substrate type in a quality control process, said using comprising:
determining whether the substrate type matches a substrate type in a print job profile; and
performing an action responsive to determining that the substrate type does not match the substrate type in the print job profile.

8. A method as in claim 1, wherein the first and second parameters are inputs to the machine learning process.

9. A method as in claim 1, comprising:
detecting, from the reflected laser light pattern, a skew, crease or wrinkle in the substrate; and
performing an action in response to detecting the skew, crease or wrinkle.

10. A method as in claim 1, comprising:
applying print agent to a surface of the substrate;
determining from the reflected diffuse light, a color of the applied print agent;
comparing the color of the applied print agent to a reference color; and performing an action if the color of the applied print agent is not within a tolerance of the reference color.

11. A method as in claim 10 wherein comparing the color of the applied print agent comprises: computing, using the processor, a color difference metric; and
wherein performing the action comprises: pausing a print job if the color difference metric is greater than a threshold.

12. A method as in claim 10, comprising:
detecting a defective region in the applied print agent; and
performing the action in response to detecting the defective region.

13. A print apparatus, comprising:
a laser source to direct laser light onto a printable medium;
a diffuse light source to direct diffuse light onto the printable medium;
an image capture device to detect i) laser light reflected from the printable medium and ii) diffuse light reflected from the printable medium; and
processing circuitry to:
determine, from the reflected laser light, a first parameter relating to the printable medium;
determine, from the reflected diffuse light, a color relating to the printable medium; and
determine a characteristic of the printable medium based on the color and the first parameter relating to the printable medium.

14. A non-transitory machine-readable medium storing instructions which, when executed by a processor, cause the processor to:
obtain first image data relating to a reflection of laser light from a printable substrate;
obtain second image data relating to a reflection of diffuse light from the printable substrate;
determine from the first image data, a first parameter relating to the printable substrate;
determine from the second image data, a second parameter relating to the printable substrate; and
determine, using the first and second parameters, a characteristic of the printable substrate using a model generated from a machine learning process.

* * * * *